United States Patent [19]

Reece

[11] Patent Number: 4,896,998

[45] Date of Patent: Jan. 30, 1990

[54] SUBMARINE CABLE PLOUGH

[75] Inventor: Alan R. Reece, Northumberland, England

[73] Assignee: Soil Machine Dynamics Ltd., Northumberland, England

[21] Appl. No.: 152,136

[22] Filed: Feb. 4, 1988

[30] Foreign Application Priority Data

Feb. 11, 1987 [GB] United Kingdom ............... 8703154

[51] Int. Cl.$^4$ ............................................. F16L 1/04
[52] U.S. Cl. .................................... 405/160; 405/164; 405/165
[58] Field of Search ............... 405/154, 159, 160, 165, 405/175, 177, 164; 37/193

[56] References Cited

U.S. PATENT DOCUMENTS

| 2,099,527 | 11/1937 | Lawton | 405/165 |
| 2,142,135 | 1/1939 | Lawton | 405/165 |
| 2,202,156 | 5/1940 | Lawton . | |
| 3,720,070 | 3/1973 | Raves | 405/177 |
| 4,011,727 | 3/1977 | Suzuki et al. . | |

FOREIGN PATENT DOCUMENTS 2313619 12/1976 France .
2069094 8/1981 United Kingdom .

Primary Examiner—David H. Corbin
Attorney, Agent, or Firm—Rodman & Rodman

[57] ABSTRACT

A plough by means of which a cable may be buried below the sea-bed is characterized by means to vary the length of the path of a cable extending through the plough, which means is responsive to changes in tension in the cable. In one preferred form of the plough, the cable extends over two surfaces and these surfaces are mounted so as to be relatively movable in response to changes in the cable tension.

6 Claims, 2 Drawing Sheets

SUBMARINE CABLE PLOUGH

IMPROVED SUBMARINE CABLE PLOUGH

The present invention is an improved submarine cable plough, that is a device by means of which a cable may be buried in the sea-bed.

It is becoming increasingly common to bury submarine cables in order to protect them from damage by fishing gear. This is most commonly done by ploughing, in which a special plough lifts up a slice of soil, places the cable beneath it and allows the soil to fall back on top of the cable. The cable passes over the plough, bending down into the soil and then back to the horizontal at its buried level around curved tracks which form an S-shaped curve. The friction as the cable slides through this S-shaped track tightens the cable behind the plough and tends to push slack in front of it. This is a potentially dangerous process because if excess slack accumulates in front of the plough, the cable may buckle underneath the plough and may then be damaged. The repair of such damage to a cable on the sea floor is very expensive.

Various methods are employed to prevent this build-up of slack. The most common is to lay the cable and plough it into the sea-bed in a single continuous operation. The cable is kept tight so that it runs in a catenary from the cable-laying ship into the front of the plough without touching the sea-bed. The main disadvantage of this method is that the cable has to be laid with an excessively high tension.

It is an object of the present invention to provide an improved submarine cable plough by means of which it is possible to bury on a continuous basis a cable which has been laid on the sea-bed some distance ahead of the plough or even as a completely separate prior operation. It is a further object to provide such an improved plough whereby this process can be carried out with very low tension in the cable.

It should be explained that one way of carrying out ploughing-in of a cable in a situation where slack can form in the cable ahead of the plough is to manoeuvre the plough to take up any slack which forms. For example, if it is known that the cable is becoming slack in front of the plough, then the cable can be tightened up by making the plough pursue a zig-zag course. This can be done using a steering system built into the plough or by steering the plough by moving the ship that is pulling it. The former method can in practice use up slack to the extent of one or two percent. The latter method can use up rather large occasional slack loops by laying the loop out on the sea-bed. The presence of such slack can be detected by measuring the tension in the cable as it passes through the plough.

In practice, difficulty arises because ploughing is a rapid process in which it is difficult to control the speed of the plough and in particular of the shp which is towing it. It is particularly difficult to stop quickly. The danger is that even if slack is detected, too much will accumulate in front of the plough before it is possible to stop the operation and decide how to take up the slack.

The improved submarine cable plough according to the present invention is characterised by means, responsive to changes in tension in cable extending through the plough, to vary the path length of the cable through the plough.

The means to vary the path length preferably takes the form of at least two surfaces, preferably at least two curved surfaces, over which the cable extends, mounted so as to be relatively movable in response to changes in tension in the cable. Both of said at least two surfaces may be movable but in a preferred form of the invention one of said relatively movable surfaces is fixed during a cable laying operation (although it may be retractable when not in use), while the other relatively movable surface is mounted for movement towards and away from the fixed said surface.

In a particularly preferred form of the invention, the means to vary the cable path length comprises a fixed, downwardly-facing convex surface and an upwardly-facing second convex surface, mounted for movement in a generally vertical plane so as to increase or decrease the path length of a cable passing in turn over said two convex surfaces. The upwardly-facing surface may be unitary or may be formed from two or more members articulated together so as to vary the curvature of said surface as said surface is moved relative to the downwardly-facing surface.

The relative movement of the at least two surfaces which together may form the path-length-varying means may be effected by pivotal movement of at least one of said surfaces, or by linear movement thereof, or by a relative sliding movement of the surfaces.

The movement of the tension-responsive means may be effected automatically or manually. Thus, for example, the tension may be monitored or specifically measured and tension values outside a desired predetermined range may give rise to an automatic response or may be corrected manually. As an alternative, the tension-responsive means may be mechanically set to maintain a constant tension, for example using springs.

Because, using the plough according to the present invention, it is no longer necessary to maintain a high level of tension in the cable ahead of the plough, it is now made possible to carry out the burying of a cable as a separate operation from the cable-laying. To take full advantage of this facility, the plough may be designed to be capable of moving across the sea-bed to find an already-laid cable and of loading the cable into itself. The separation of laying and buring operations in this way is advantageous, since the cable-laying is carried out from a relatively expensive cable ship at high speed, while ploughing is carried out from a much cheaper vessel at relatively slow speed.

The invention will now be further described with reference to the accompanying drawings, wherein.

Figure 1:
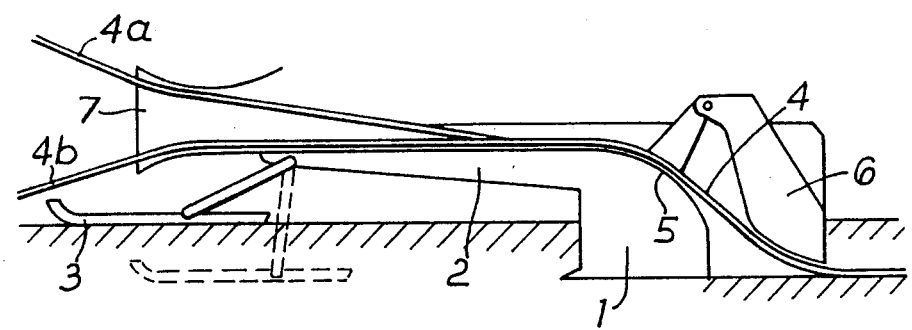
FIG. 1 is a simplified view in elevation of a conventional submarine cable plough.

The conventional plough illustrated in FIG. 1 comprises a plough body 1, digging into the sea-bed as shown and connected by a long beam 2 to a pair of skids 3 which control the ploughing depth. The cable 4 passes along the beam of the plough and bends round the fixed bend 5 in the plough body 1, being forced down into the ground by a cable depressor 6. At the front of the plough, the cable enters the plough through a bell mouth 7, either directly from the ship as at 4a or from the sea-bed as at 4b. The radii at 5, 6 and 7 are large enough not to damage the particular cable being laid. The cable depressor 6 can usually be moved up and down to facilitate loading the cable into the plough.

Figure 2:
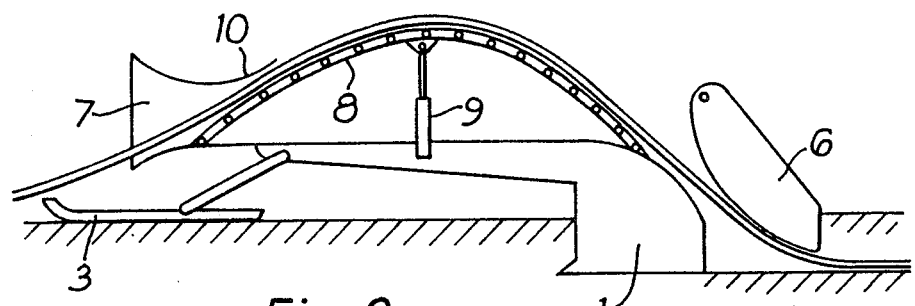
FIG. 2 illustrates schematically a first embodiment of the improved plough according to the invention.

Referring now to FIG. 2, in the illustrated form of the plough, a cable trough 8 along the top of the plough beam is made flexible so that it can be moved upwards by means such as hydraulic rams 9 or springs (not shown). The flexible trough 8 is so constructed that it cannot bend to a smaller radius than that tolerated by the cable. The bell mouth 7 is extended backwards to provide a radius 10 which co-operates with the flexible track 8, and the cable depressor 6 also provides a suitable co-operating curve. It will be evident that the length of cable curved in the plough is considerably greater when the flexible track is raised up than when it is lying flat along the plough beam.

Two ways of controlling the device, which is hereinafter referred to as the slack accumulator, may be described. In one, the tension in the cable is measured and if it is too low the lifting means 9 is activated to lower the track. This can be done by a closed loop servomechanism or by an open loop containing a human operator.

Another method of control is to make the lifting means 9 out of an arrangement of springs, with a varying spring rate, such as to maintain the required tension in the cable as the flexible track rises and falls.

Figure 3:
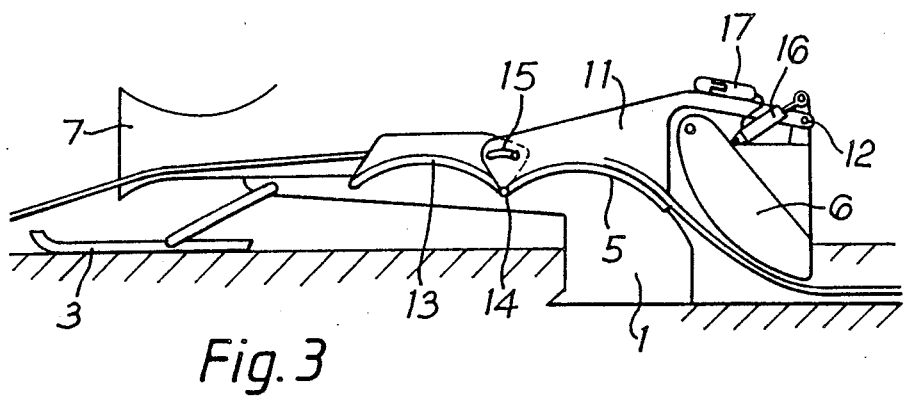
FIG. 3 illustrates a second embodiment of the improved plough according to the invention, in its condition when the cable is taut.
Figure 4:
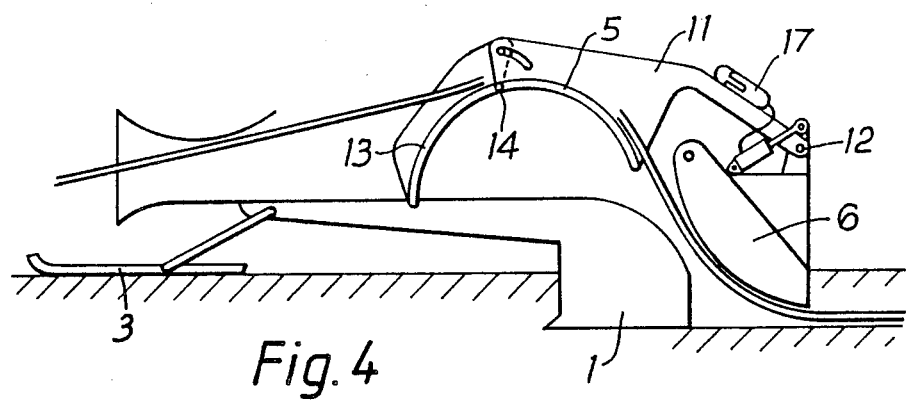
FIG. 4 is a view corresponding to FIG. 3 but showing the plough in its condition taking up maximum slack.

The improved plough illustrated in FIGS. 3 and 4 is another embodiment of the invention, devised to be able to store a maximum amount of cable slack with a minimum of moving parts. A key feature is a curved track 5 which, instead of being a part of the plough body as in a conventional plough, is fixed to a pivotting arm 11, mounted for rotation about the centre 12 of the circular arc of the cable depressor 6. A second arcuate segment of track 13 is pivotted to the first track 5 at its front 14 and its freedom to swing downwards is limited by, for example, a pin and slot arrangement 15 which enables the two parts 13 and 15 to form a single circular arc. The arm 11 is urged upwards about its pivot 12 by a hydraulic ram 16. This is controlled by oil flow from an hydraulic pump in a servo controlled system or by oil stored in an hydraulic accumulator 17 if a sprung system is required.

FIG. 4 shows the accumulator in the fully raised position with a maximum amount of cable stored. If this fully-raised position is reached when the plough is being pulled along the cable while the cable is still connected to the cable laying vessel, which is not too far ahead, then the vessel can back up and take in cable to remove the slack.

The slack accumulator makes it possible to plough along a previously laid cable, and this can be done with the plough shown in FIGS. 3 and 4 if divers are available to load the cable into the plough, and to unload it when ploughing is complete.

In one form of the improved submarine cable plough according to the invention, the need for divers is avoided in its application to already-laid cables by providing the plough with means of self-propulsion over the sea-bed and with a self-loading and unloading mechanism. Such latter mechanisms are readily devised by those skilled in the art. For this purpose, the two normal depth control skids 3 may be replaced by a pair of lightweight crawler tracks or by suitable support rollers or wheels.

Figure 5:
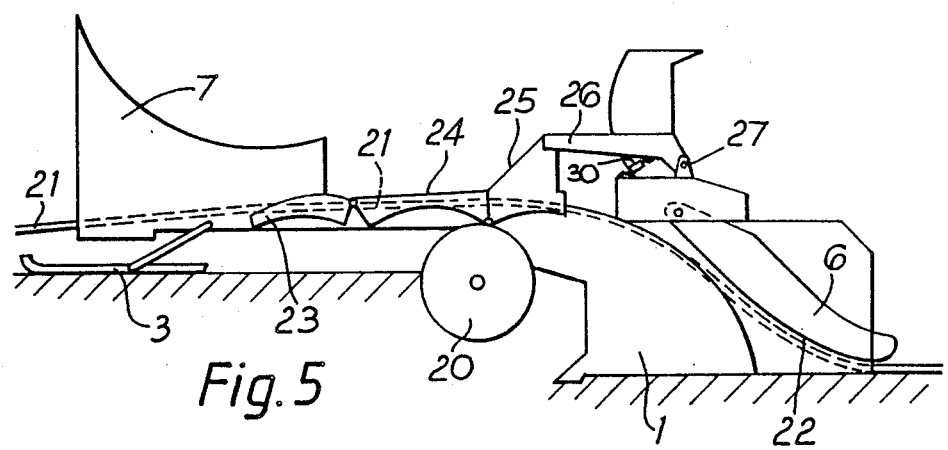
FIG. 5 illustrates a preferred third embodiment of the improved plough according to the invention, in its condition when the cable is taut.
Figure 6:
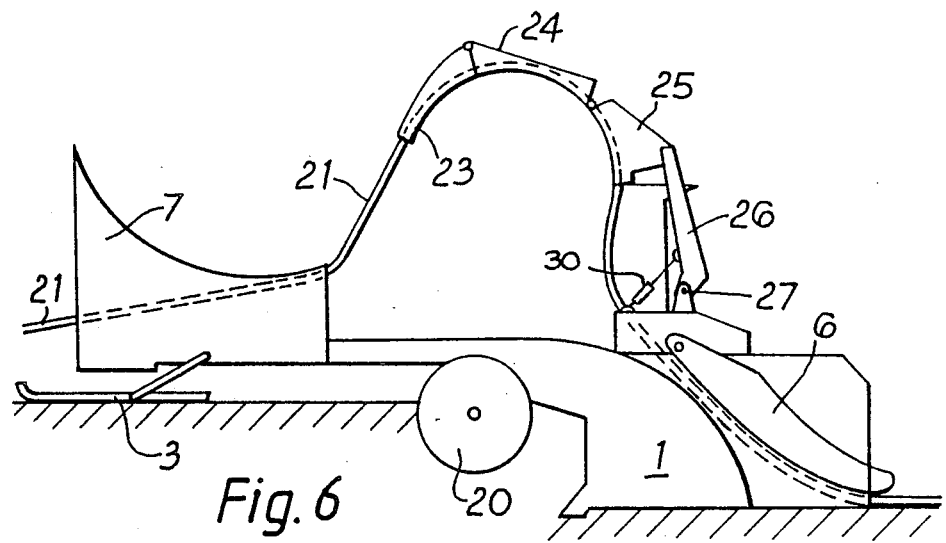
FIG. 6 is a view corresponding to FIG. 5 but showing the plough in its condition taking up slack in the cable to the maximum extent.

Turning now to the submarine cable plough which is illustrated in FIGS. 5 and 6 of the drawings, which plough is a preferred embodiment of the present invention, the plough body 1 is again supported at its operationally forward end upon skids 3. Projecting downardly into the sea-bed ahead of the leading edge of the plough itself is a cutting disc 20, which penetrates the ground surface and thereby prepares the ground for the plough blade. A submarine cable 21 enters the front end of the plough through a bell mouth 7 and follows a path which varies between a shortest route illustrated in FIG. 5 and a longest route illustrated in FIG. 6.

The cable path is determined by the relative positions of a downwardly convex surface 22 of a cable depressor 6 and an upward-facing surface formed in three inter-pivoted sections 23, 24 and 25. These sections are supported on an arm 26, which is pivotally mounted on the plough at 27.

The arm 26 is movable by hydraulic means (30) between a generally horizontal orientation illustrated in FIG. 5 and a generally vertical orientation illustrated in FIG. 6. When the arm 27 is horizontal, the sections 23, 24 and 25 adopt a position in which they together present a level or shallow convex upper surface such that the cable 21 extends by a fairly direct path from the inlet of the bell-mouth 7 to the rearward end of the plough adjacent to the cable depressor 6. However, when the arm 27 is pivotted upwardly towards the position shown in FIG. 6, the sections 23, 24 and 25 mutually pivot to form a curved upper surface, which is elevated to an extent determined by the upward inclination of the arm 27 and over which the cable must pass. In this way, the length of the cable path through the machine is increased to a sufficient extent to take up slack in the cable and thereby maintain the tension in the cable between the desired predetermined limits.

It will be observed that the movable upwrdly-convex surface is formed in two parts in the form of the plough which is illustrated in FIGS. 3 and 4 and that it is formed in three parts in the preferred embodiment illustrated in FIGS. 5 and 6. While three such parts is an optimum number, the surface may if desired be formed in more sections than three. Furthermore the surface may be pivoted from its forward end or from a section other than an end section. In one embodiment (not illustrated), the surface is formed in three mutually pivoted sections and is supported at its middle section upon a parallel-motion linkage.

I claim:

1. A plough for burying a submarine cable below the surface of the sea-bed, which plough comprises a plough blade for cutting a continuous channel in said sea-bed by movement of the plough along the sea-bed surface, guide means defining a cable pathway through said plough from a point forward of said plough blade to a point rearward of said plough blade, said pathway extending over an upwardly-facing generally convex surface and a downwardly-facing generally convex surface, said upwardly-facing generally convex surface being articulated whereby to modify its curvature and further being mounted for pivotal movement relative to said downwardly-facing generally convex surface, monitoring means to monitor the tension in a cable passing through said pathway and hydraulic pathway varying means to automatically effect pivotal movement of said upwardly-facing generally convex member when said tension differs from a predetermined value.

2. A submarine cable plough according to claim 1, wherein said pathway varying means comprises at least one hydraulic ram.

3. A submarine cable plough according to claim 2, wherein said articulated convex surface is variable between a less curved shape when said upwardly-facing and downwardly-facing surfaces are closer together, whereby to define a shorter said cable pathway, and a more curved shape when said respective surfaces are further apart, whereby to define a longer cable pathway.

4. A plough for burying a submarine cable below the surface of the sea-bed, which plough comprises a plough blade for cutting a continuous channel in said sea-bed by movement of the plough along the sea-bed surface, guide means defining a cable pathway through said plough from a point forward of said plough blade to a point rearward of said plough blade, said pathway extending over two opposed generally convex surfaces which are ounted for relative movement, one of said generally convex surfaces being articulated to modify its curvature, monitoring means to monitor the tension in a cable passing through said cable pathway and hydraulic pathway varying means, operable to move said articulated generally convex surface and thereby effect relative movement of the two generally convex surfaces when said tension differs from a predetermined value, to change the length of said cable pathway.

5. A submarine cable plough according to claim 4, wherein said articulated generally convex surface is movable and the other geneally convex surface is fixed.

6. A submarine cable plough according to claim 4, wherein said articulated generally convex surface is upward-facing and the other generally convex surface is downward-facing.

* * * * *

UNITED STATES PATENT AND TRADEMARK OFFICE
CERTIFICATE OF CORRECTION

PATENT NO. : 4,896,998
DATED     : January 30, 1990
INVENTOR(S) : Alan R. Reece

It is certified that error appears in the above-identified patent and that said Letters Patent is hereby corrected as shown below:

At column 1, line 57, change "shp" to --ship--.

At column 4, line 41, change "upwrdly" to --upwardly--.

At column 6, line 3, change "ounted" to --mounted--.

Signed and Sealed this

Nineteenth Day of November, 1991

Attest:

HARRY F. MANBECK, JR.

*Attesting Officer*        *Commissioner of Patents and Trademarks*